United States Patent [19]

Hall et al.

[11] Patent Number: 5,592,342
[45] Date of Patent: Jan. 7, 1997

[54] METHOD FOR PACKING VARIABLE SIZE USER DATA RECORDS INTO FIXED SIZE BLOCKS ON A STORAGE MEDIUM

[75] Inventors: Dana Hall, Bellingham, Mass.; Haim Bitner, Raanana, Israel

[73] Assignee: Quantum Corporation, Milpitas, Calif.

[21] Appl. No.: 247,378

[22] Filed: May 23, 1994

[51] Int. Cl.$^6$ .............................. G11B 20/12; G11B 5/09; G11C 8/00
[52] U.S. Cl. .............................................. 360/48; 360/72.2
[58] Field of Search ...................... 360/48, 72.2; 395/600

[56] References Cited

U.S. PATENT DOCUMENTS

| | | | |
|---|---|---|---|
| 3,141,151 | 7/1964 | Gilson | 340/172.5 |
| 3,711,844 | 1/1973 | Irwin | 360/48 |
| 4,835,628 | 5/1989 | Hinz et al. | 360/48 |
| 4,899,232 | 2/1990 | Odaka et al. | 360/48 |
| 5,034,914 | 7/1991 | Osterlund | 395/875 |
| 5,167,034 | 11/1992 | MacLean, Jr. et al. | 395/185.05 |
| 5,194,995 | 3/1993 | Severtson et al. | 360/48 |
| 5,200,864 | 4/1993 | Dunn et al. | 360/48 |
| 5,210,851 | 5/1993 | Kato et al. | 360/48 |
| 5,325,370 | 6/1994 | Cleveland et al. | 371/37.4 |
| 5,388,013 | 2/1995 | Nakamura | 360/48 |

*Primary Examiner*—Thomas G. Black
*Assistant Examiner*—Jack M. Choules
*Attorney, Agent, or Firm*—John C. Chen; David B. Harrison

[57] ABSTRACT

A method and an apparatus for packing variable size user data records into fixed size blocks on a storage medium. The invention includes the steps of receiving user data of variable record lengths along with error detection information; creating a data page for each user data record; building a map entry of record packing information for each data page; and storing each data page and its associated map within the same physical record on a storage medium. The data pages being stored in consecutive order and the map entries are stored in reverse order. A predetermined number of physical blocks are combined to form a logical block and a predetermined number of logical blocks form an entity.

16 Claims, 3 Drawing Sheets

METHOD FOR PACKING VARIABLE SIZE USER DATA RECORDS INTO FIXED SIZE BLOCKS ON A STORAGE MEDIUM

BACKGROUND OF THE INVENTION

Magnetic tapes continue to provide low-cost input/output capability for computer data interchange and off-line storage. To improve performance different schemes have been used to maximize tape area usage, primarily through data compression schemes and record packing schemes that reduce tape wastage between records on tape. In the past, if a user data record ended in the middle of a tape block the rest of the tape block had to be padded so that the next user data record could be written at the next tape block. This led to significant wastage of tape due to padding between records.

Before the use of data compression schemes, a smart and efficient user would choose data records that were multiples of the native tape block size. With that choice of records, tape blocks were used in full without padding. However, with the advent of data compression schemes, user data becomes compressed to variable sizes thereby using up fractions of tape blocks, hence causing wastage.

In order to overcome the problem of wasted area on tapes while using data compression schemes, record packing techniques are used. One such scheme uses super tape blocks of variable Size capable of containing multiple user data records. This scheme requires the use of variable size headers for each variable size super tape block to describe the partition of user data records within each block. Such a scheme is not suitable for systems using fixed size tape blocks. Further, for systems using block ECC codes variable block sizes are not efficient.

Another record packing scheme is used with the Digital Audio Tape (DAT) fixed block tape format. The DAT is a helical scan tape having diagonal tracks. Data records are written in groups of about 20 tracks. In the last track of each group an index is maintained that describes the partition of the tracks in the group. Having the index in the last track of the group makes appending to data records in DAT difficult. Further, if the index is irrecoverable for some reason the amount of data lost is significant. There is a need for a record packing scheme that uses fixed size tape blocks to store variable size user data records while using data compression techniques to maximize tape utilization.

SUMMARY OF THE INVENTION

The present invention is a method and an apparatus for packing variable size user data records into fixed size blocks on a storage medium.

An object of the invention is a method and apparatus for improving magnetic tape capacity through record packing by reducing the wastage of tape between data records.

Another object of the invention is to ensure that data is appended at the proper physical location on the tape, thus providing an advantageous decrease in soft error rate encountered during read and append operations.

These and other objects are attained, in a broad sense, through the use of various features of the invention. The invention includes the steps of receiving user data of variable record lengths along with error detection information; creating one or more data pages for each user data record; building a map of record packing information for each data page; and storing each data page and its associated map within the same physical record on a storage medium.

In a narrower sense the objects of the invention are attained by the use of a storage medium that has physical blocks of pre-determined fixed size, where each physical block further comprises a data field and a map field. The data field comprises pages of user data and the map field comprises record packing information for each page of user data in said data field.

In yet another sense the objects of the invention are attained by locating the page and map entries within each physical block, locating the map entry at the bottom of the physical block, and by building the page and map entries from opposite directions.

It is an advantage of this invention that tape area usage is maximized using a record packing scheme that reduces tape wastage between records on tape.

It is yet another advantage of this invention that the map entry for each data page is co-located with its associated data page within the same physical block thereby providing a data integrity guarantee during append operations such that if an append operation is unsuccessful, all data objects located prior to the append location are fully recoverable.

The foregoing and additional objects, features and advantages of the present invention will become apparent to those skilled in the art from a more detailed consideration of the preferred embodiment thereof, taken in conjunction with the accompanying drawings.

BRIEF DESCRIPTION OF THE DRAWINGS

FIG. 3 is a detailed diagram of the format of the physical block of FIG. 2a.

DETAILED DESCRIPTION OF THE INVENTION

Figure 1:
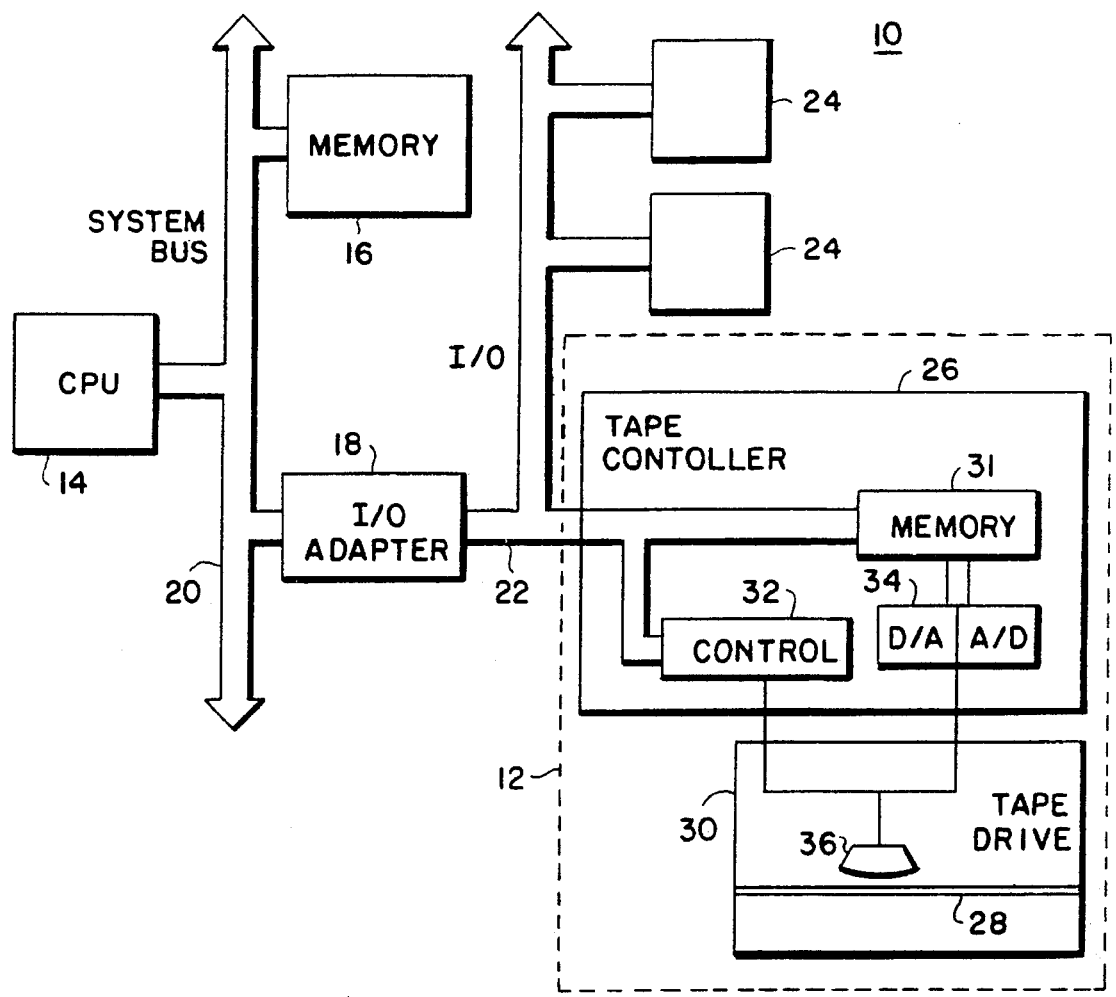
FIG. 1 is a block diagram of a computer system incorporating a tape drive according to the principles of the invention.

FIG. 1 is an example of a computer system 10 according to the invention that includes a tape system 12. The computer system 10 includes among other components a CPU 14, memory 16, and I/O bus adapter 18 all coupled to a system bus 20. Coupled to the I/O bus adapter 18 is an I/O bus 22, which supports various peripheral devices 24 and a tape drive controller 26, which controls data transfers to and from a tape 28 within a tape drive 30. The tape controller 26 further includes a memory 31, control logic 32, and a digital to analog convertor 34. The tape drive 30 includes a tape head 36 and the tape 28.

In order to write data to the tape 28, data passes through the I/O adapter 18 from the system bus 20 to the I/O bus 22. The tape controller 26 stores the data in the memory 31. When an entire "record" of information has been stored in the memory 31, it is then transferred by direct memory access (DMA) to the tape 28. In a conventional manner, the digital to analog convertor 34 converts the data to the analog form suitable for tape storage, while the control logic 32 provides the proper control signals to the tape head 36 in the tape drive 30.

Figure 2:
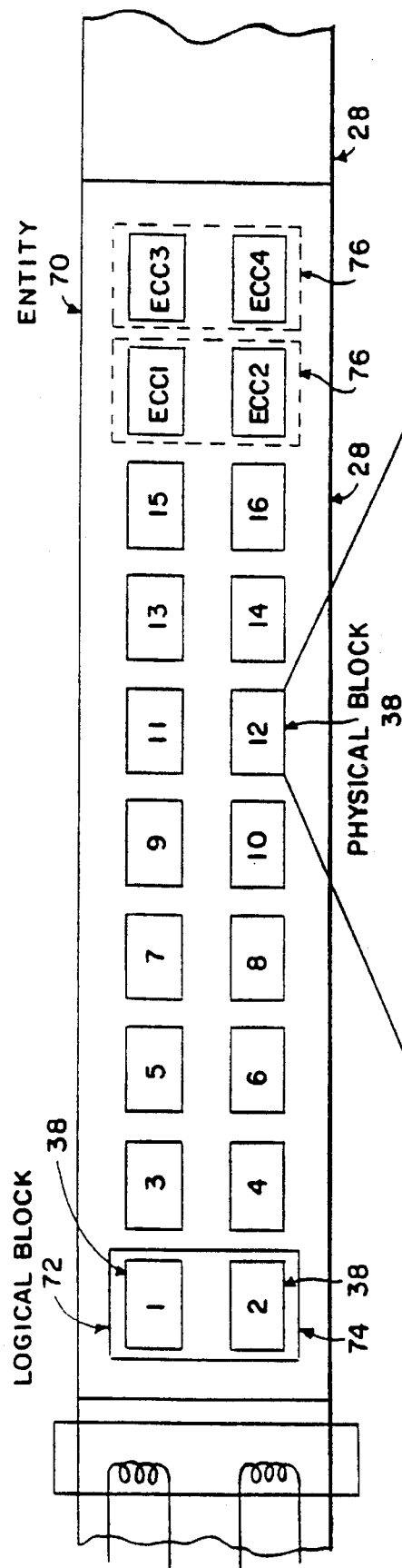
FIG. 2 is a simplified block diagram of the format of stored information on a tape according to the principles of the invention.

More specifically, data records are written on the tape 28 in entities as shown in FIG. 2. Each entity 70 includes ten logical blocks 72, composed of eight data blocks 74 and two ECC blocks 76. Each logical block 72 has two physical blocks 38, written on two tracks. There are gaps between the each physical block.

Figure 2A:
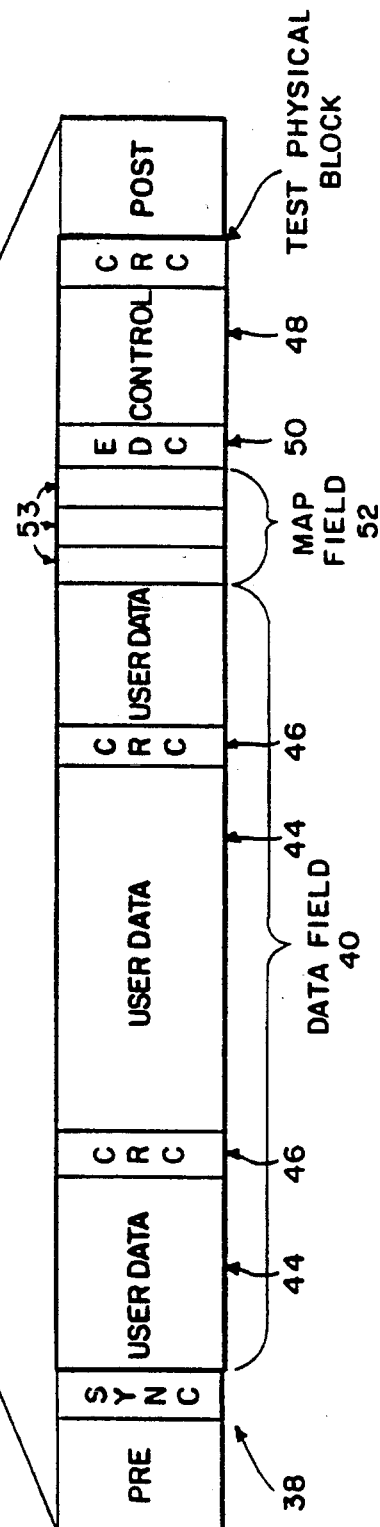
FIG. 2a is an exploded view of a physical block stored on a tape according to the principles of the invention.

Further as shown in FIG. 2a, each physical block 38 comprises data pages 44, error detection information in the form of CRC checksums 46 for each page of data, together defining data field 40. Also as shown in FIG. 2a, each physical block 38 also comprises map field 52 of map entries 53 of record packing information for each data page 44, Error Detection Code (EDC) 50 and control block 48.

Figure 3:
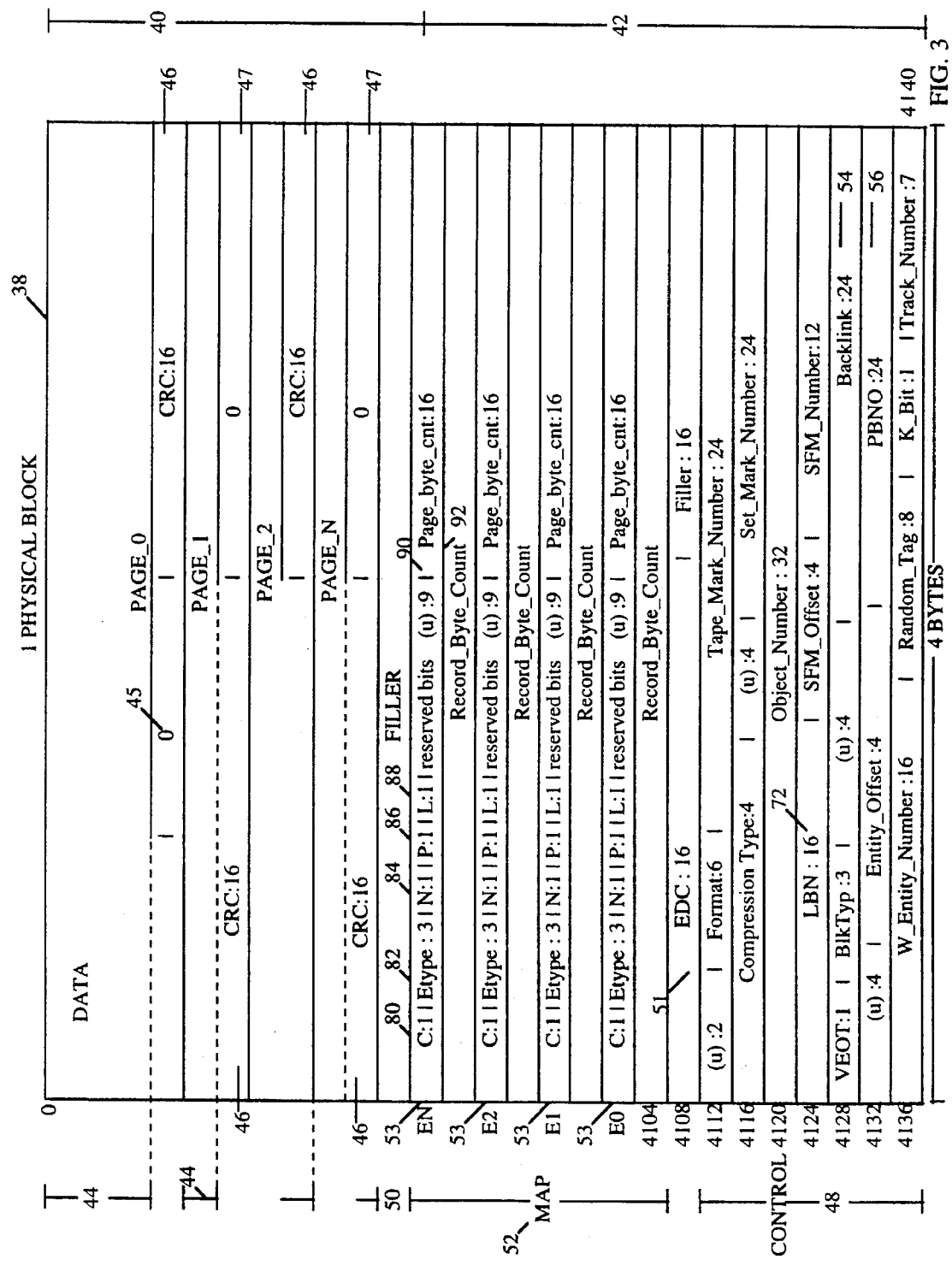

Further as shown in detail in FIG. 3, according to the principles of the invention, each physical block 38 comprises 4140 bytes. Part of the physical block 38, shown as section 40, is DMA'ed from memory, while the remainder, shown as 42, is added from memory 31 at the end of the block. Section 40 of the physical block includes data fields 44, or pages, containing the actual stored data, and CRC checksums 46 for each page of data. As shown in FIG. 3, the data field 40, filler 50 and the map field 52 together add up to 4108 bytes. The map field 52 has 1 to 100 map entries 53, each map entry 53 being 8 bytes. Therefore, if there is only one map entry 53, then the maximum size of the data field 40 is 4100 bytes. Similarly, if there are 100 map entries 53, i.e. 800 bytes of map entries in map field 52, then the maximum size of the data field 40 is 3208 bytes.

As shown in FIG. 3, the data field 40 of each physical block 38 comprises data pages 44. A data page 44 is a group of data bytes inside a physical tape block 38. All data bytes in a page 44 belong to one record. A record may have started in a previous physical block and may continue to the next physical block, hence a data record maybe be written in one or more pages 44.

As explained above, a data page 44 may have 0 to 4100 bytes of data. If a data page 44 is the last page for a record it has two bytes of CRC 46 following the data page 44. As shown in FIGS. 2a and 3, after the two bytes of CRC 46 another data page 44 may begin with data belonging to the next user record. In FIG. 3, Page 0, Page 1, and Page 2 are data pages 44 belonging to different data records and are each followed by two bytes of CRC 46.

As shown in FIG. 3, the two bytes of CRC 46 are written in even offset. Therefore, if the page byte count is odd there is a pad byte, i.e., one byte of zero (indicated by reference numeral 45 in FIG. 3) between the data page 44 and the CRC 46. As shown in FIG. 3, Page 0 has an odd page byte count and therefore has a pad byte 45 of zero between the end of data page 0 and the two bytes of CRC 46 following data page 0. Further, as shown in FIG. 3, if the page byte count is even, the CRC 46 immediately follows the last data byte of the data page 44. As shown in FIG. 3, Page 2 has an even page byte count and therefore has no pad byte 45 of zero between the end of data page 2 and the two bytes of CRC 46 following data page 2.

Also, as shown in FIG. 3, a data page 44 must begin in a 4*N offset. Therefore, if a previous data page CRC 46 doesn't end in 4*N offset, two bytes of zeros 47 are appended after the CRC to enable the following data page to begin with a 4*N offset. For example, as shown in FIG. 3, CRC 46 for data page 1 doesn't end in 4*N offset, and therefore two bytes of zeros 47 are appended after the CRC 46 to enable the following data page 44, i.e. page 2, to begin with a 4*N offset.

However, as shown in FIG. 3, if the data pages 44 and the map field entries 53 don't add up to 4108 bytes then the remaining byte locations in the data field 40 up to the beginning of the map field 52 are filled with zeros. This entry is called a filler and is denoted by reference numeral 50 in FIG. 3.

Further, as shown in FIG. 3, each physical block 38 comprises a map field 52 of map entries 53 of record packing information for each data page 44, according to the principles of the invention. As shown, the logically first map entry 53, i.e., the map entry 53 belonging to the first data page 44, is physically the last map entry 53 in the physical block 38. For example, as shown in FIG. 3, the map entry E0, represented by reference numeral 53, belonging to the first data page 44, denoted by page 0, is physically the last map entry 53 in the physical block 38, but logically the first map entry 53. Similarly, as shown in FIG. 3, map entry E1, belonging to data page 1, is physically the second from last map entry 53 in the physical block 38.

Further, as shown in FIG. 3, each map entry 53 is eight bytes long and comprises several sub-fields. The first sub-field is the "compress" field 80 which occupies 1 bit in each map entry and is denoted by C:1 in each map entry 53 (E0 . . . EN) of FIG. 3. If the compress field bit is set to '1', it indicates that the data in the corresponding data page 44 is stored in compressed format.

The next map entry/sub-field is the "type" field 82. As shown in FIG. 3, each "type" field 82 occupies 3 bits and is denoted by Etype:3 in each map entry 53 (E0 . . . EN). Each map entry 53 either describes either a data page, a tape mark or a filler. The type field 82 using three bits indicates the type of data in the data field 40 that the map entry 53 represents. According to the principles of the invention, when a map entry 53 represents a corresponding data page 44 having user data, the three bits of "type" field 82 are set to indicate a user data page 44. When a map entry 53 represents a file demarker, the three bits of "type" field 82 are set to indicate a tape mark.

Similarly, when a physical block 38 has no data pages, the corresponding map entry 53 has the "type" field 82 set to represent filler 50. Further, when data pages 44 and the map field entries 53 don't add up to 4108 bytes, the remaining byte locations in the data field 40 up to the beginning of the map sub-field 52 are also occupied by filler 50. However, fillers of this type don't have any associated map entry.

Further, as shown in FIG. 3, each map entry 53 has a "next" sub-field 84 which occupies 1 bit, and is denoted by N:1 in each map entry 53 (E0 . . . EN). If the "next" sub-field bit 84 is set to '1' it indicates that a user data record continues on to the next physical block 38.

Also as indicated in FIG. 3, another sub-field in a map entry 53 is the "previous" field 86 which also occupies 1 bit, and is denoted by P:1 in each map entry 53 (E0 . . . EN). If the "previous" field bit 86 is set to '1' it indicates that the record in a data page 44 is a continuation of a record from a previous physical block 38.

Further, as shown in FIG. 3, another sub-field in each map entry 53 is the "last" field 88 which occupies 1 bit and, and is denoted by L:1 in each map entry 53 (E0 . . . EN). The "last" field 88 indicates whether a particular map entry is the last logical map entry.

Further, as shown in FIG. 3, there are also nine reserved bits in each map entry 53 which are always set to zeros. These reserved bits are indicated by (u):9 in FIG. 3.

Also, as shown each map entry 53 contains a page byte count 90 that occupies two bytes. The page byte count 90, represented as page_byte_cnt:16 in FIG. 3, indicates the size of the corresponding data page 44, or tape mark, or filler 50. The page byte count 90 does not including the pad bytes 45 or the CRC 46. Also included in each map entry 53 is a record byte count 92 that occupies four bytes. The record byte count 92 indicates the size of the user record in the corresponding data page 44 before compression.

Further, as shown in FIGS. 2a and 3, following the data field 40 and the map field 52, i.e., at byte location 4108 in each physical block is the EDC 51. As shown, the EDC 51 (EDC:16) occupies 2 bytes and is used to check the integrity of each physical block 38 in read and write modes.

Further as shown in FIGS. 2a and 3, each physical block 38 also includes a control field 48 containing bits representing various characteristics of the physical block 38, such as format codes, tape markers, data types, compression types, etc. As shown in FIG. 3, a logical block number field 72 is also included, representing the logical position of the physical block 38 on the tape relative to other physical blocks 38. Further, as shown, the control field 48 of each physical block 38 also includes a backlink field 54, used during appends to determine the physical location of the append target block, a physical block number field 56, and other fields not directly pertinent to the present invention.

The control block 48 and it's various sub-fields are used to ensure that data is appended at the proper physical location on tape.

According to the principles of the invention, as shown in FIGS. 2a and 3, having each map entry 53 and its associated data page 44 co-located within the same physical block 38 provides a data integrity guarantee during append operations. If an append operation is unsuccessful, the record packing format allows all data objects located prior to the append location to be fully recoverable as their map entries 53 are physically co-located with the data pages 44 on the media, according to the principles of the invention.

It is apparent that, within the scope of the invention, modifications and different arrangements may be made other than herein disclosed. The present disclosure is merely illustrative, the invention comprehending all variations thereof.

We claim:

1. A method for packing user data records into physical blocks of predetermined storage capacity defined on a storage medium comprising:

receiving user data record of variable lengths;

building a map field of record packing information for each one of the physical blocks;

formatting the user data record and map field of record packing information into the physical blocks, the step of formatting comprising the steps of:

creating a plurality of variable length data pages from the user data record;

building a map entry of record packing information within the map field for each of the plurality of data pages; and storing each one of the plurality of data pages and the map entry for each one of the plurality of data pages within the physical block, the step of storing each one of the plurality of data pages and the map entry comprising the step of:

arranging the data pages in consecutive order within the physical block and arranging the map entries in reverse order within the physical block;

grouping a fixed number of said physical blocks in groups to define logical blocks, grouping a fixed number of said logical blocks in groups to define entities on the storage medium; and storing said entities on the storage medium.

2. The method of claim 1 wherein the step of building a map entry of record packing information for each data page further comprises the steps of:

storing information in the map entry, the information includes means which indicates if a data page is compressed;

storing information in the map entry, the information includes means which indicates the type of data in the associated data page;

storing information in the map entry that indicates if a user record continues into a subsequent physical block;

storing information in the map entry that indicates if a user record is a continuation of a record from a previous physical block;

storing information in the map entry that indicates if a particular map is the last map entry in a physical block;

storing information in the map entry that indicates the size of the associated data page; and storing information in the map entry that indicates the size of the user data before compression.

3. The method set forth in claim 1 wherein the step of formatting user data into fixed physical blocks comprises formatting user data into physical blocks of 4140 bytes.

4. The method set forth in claim 1 wherein the step of grouping said fixed physical blocks into groups to define logical blocks comprises grouping two adjacent fixed physical blocks to define one logical block.

5. A system for storage of user data records on a medium, said medium comprising:

at least one user data record entity; said entity comprising a fixed number of groups of logical blocks; each block of said group of logical blocks comprising a fixed number of physical blocks of predetermined fixed size; each physical block of said plurality of physical blocks further comprising:

a plurality of variable length data pages;

a map field comprising a variable number of map entries of record packing information, there being a separate map entry for each data page of said plurality of data pages;

a control field comprising control entries of information relating a logical position of the physical block to other physical blocks on the medium; and the data pages are arranged in consecutive order within the physical block and the map entries are arranged in reverse order within the physical block.

6. The system for data storage of user data records on a medium set forth in claim 5 wherein said physical block is 4140 bytes long.

7. The system for data storage of user data records on a medium set forth in 5 wherein said logical block comprises two physical blocks contiguously arranged on the medium.

8. The system for data storage of user data records on a medium as set forth in claim 5 wherein the medium comprises linear magnetic tape, and wherein the system comprises a linear magnetic tape drive and tape drive controller for connection to a host computing system via an interface bus structure.

9. The system for data storage of user data records on a medium set forth in claim 5 wherein the map entry for the data page comprises:

a compress field that indicates if the data page is compressed;

a type field that indicates data in the data page is one of user data, a tape mark and filler;

a next field that indicates if a user record continues into a subsequent physical block within the entity;

a previous field that indicates if a user record in the data page is a continuation of a record from a previous physical block within the entity;

a last field that indicates if a particular map is a last map entry in the map field of the physical block;

a page byte count field that indicates a size of the data page;

a record byte count field that indictes a size of the user record in the data page before compression.

10. The system for data storage of user data records on a medium set forth in claim 9 wherein each said map entry comprises 8 bytes.

11. In a data storage and retrieval system including a controller and a recording and playback mechanism containing a data storage medium, a method of packing variable size user data records into fixed size physical blocks on the storage medium, comprising the steps of:

receiving the variable size user data records into the data storage and retrieval system;

defining at least one data page within a fixed size block for each user data record, a number of data pages being defined as based on size of the user data record;

building a map entry of record packing information for each data page defined within the fixed size block;

storing each data page and the map entry for the data page within the fixed size block on the storage medium, the step of storing comprising the step of:

arranging the data pages in consecutive order within the fixed physical block and arranging the map entries in reverse order within the fixed physical block;

building a control field of block information for relating user data record information stored in the fixed size block to other fixed size blocks on the storage medium;

storing each control field within the fixed size block on the storage medium;

grouping a fixed number of said fixed size physical blocks in groups, each group defining a logical block;

grouping a fixed number of said logical blocks in groups, each group defining an entity; and storing said entities on the storage medium.

12. The method set forth in claim 11 wherein the step of building the map of record packing information for each data page comprises the steps of:

building a compress field that indicates if the data page is compressed;

building a type field that indicates data in the data page is one of user data, a tape mark and filler;

building a next field that indicates if a user record continues into a subsequent fixed size block on the medium;

building a previous field that indicates if a user record in the data page is a continuation of a record from a previous fixed size block on the medium;

building a last field that indicates if a particular map is a last map entry in the map field of the fixed size block;

building a page byte count field that indicates a size of the data page; and building a record byte count field that indictes a size of the user data record in the data page before application of any data compression to the user data record.

13. The method set forth in claim 11 comprising the further step of defining each said fixed size block as 4140 bytes long.

14. The method set forth in claim 11 comprising a further step of defining a logical block of two fixed length blocks contiguously arranged on the medium.

15. The method set forth in claim 11 wherein the step of building a map of record packing information comprises the step of forming the map as an 8 byte entry.

16. The method set forth in claim 11 wherein the medium comprises linear magnetic tape, and wherein the system comprises a linear magnetic tape drive and tape drive controller for connection to a host computing system via an interface bus structure.

* * * * *